US011359944B2

(12) United States Patent
Baret et al.

(10) Patent No.: US 11,359,944 B2
(45) Date of Patent: Jun. 14, 2022

(54) SYSTEM AND METHOD FOR SPATIALLY RESOLVED DETERMINATION OF AT LEAST ONE PHYSICAL OR CHEMICAL PROCESS VARIABLE

(71) Applicant: Endress+Hauser SE+Co. KG, Maulburg (DE)

(72) Inventors: Marc Baret, Kembs (FR); Holger Eberhard, Stuttgart (DE); Heiko Oehme, Jena (DE); Nicolas Wimmer, Maulburg (DE); Emilio Schiavi, Oberwil (CH); Detlev Wittmer, Maulbronn (DE); Hege Bjonnes, Arlesheim (CH); Ulrich Kaiser, Basel (CH)

(73) Assignee: ENDRESS+HAUSER SE+CO. KG, Maulburg (DE)

( * ) Notice: Subject to any disclaimer, the term of this patent is extended or adjusted under 35 U.S.C. 154(b) by 67 days.

(21) Appl. No.: 16/762,613

(22) PCT Filed: Sep. 17, 2018

(86) PCT No.: PCT/EP2018/075052
§ 371 (c)(1),
(2) Date: May 8, 2020

(87) PCT Pub. No.: WO2019/091641
PCT Pub. Date: May 16, 2019

(65) Prior Publication Data
US 2020/0348157 A1    Nov. 5, 2020

(30) Foreign Application Priority Data
Nov. 8, 2017    (DE) .................... 10 2017 126 128.1

(51) Int. Cl.
*G01D 21/02*    (2006.01)
*G08C 17/02*    (2006.01)

(52) U.S. Cl.
CPC ............. *G01D 21/02* (2013.01); *G08C 17/02* (2013.01)

(58) Field of Classification Search
CPC ........ B02C 19/11; B01D 45/12; G01D 21/02; G08C 17/02
See application file for complete search history.

(56) References Cited

U.S. PATENT DOCUMENTS 4,783,314 A    11/1988    Hoots et al.
7,591,979 B2    9/2009    Hill et al.
(Continued)

FOREIGN PATENT DOCUMENTS

CN    1318148 A    10/2001
CN    101711351 A    5/2010
(Continued)

*Primary Examiner* — Daniel R Miller
*Assistant Examiner* — Eric Sebastian Von Wald
(74) *Attorney, Agent, or Firm* — Mark A. Logan; Endress+Hauser (USA) Holding Inc.

(57) ABSTRACT

Disclosed is a system for spatially resolved determination of at least one physical or chemical process variable of a flowable medium arranged in a container in an automation system, at least one sensor being provided, which is movable in the medium and/or in the container and which ascertains information about the at least one process variable, a position determination unit being provided which supplies the information about the respective current position of the sensor relative to the medium and/or to the container, and a data transmission unit being provided which collects information about the respective current position of the sensor and the corresponding information supplied by the sensor about the at least one process variable and/or communicates
(Continued)

the information to an external control unit and/or display unit.

13 Claims, 3 Drawing Sheets

(56) References Cited

U.S. PATENT DOCUMENTS

| | | | |
|---|---|---|---|
| 8,615,374 B1* | 12/2013 | Discenzo | G01D 21/02 |
| | | | 702/127 |
| 2006/0260384 A1 | 11/2006 | Gysling et al. | |
| 2009/0204250 A1* | 8/2009 | Potyrailo | G06K 19/0723 |
| | | | 700/109 |
| 2010/0254650 A1 | 10/2010 | Rambow | |
| 2011/0030482 A1 | 2/2011 | Meeusen et al. | |
| 2013/0238145 A1* | 9/2013 | Hammer | G01F 23/0076 |
| | | | 700/279 |
| 2016/0139101 A1 | 5/2016 | Scott et al. | |
| 2017/0068243 A1* | 3/2017 | MacCready | G05D 1/0206 |

FOREIGN PATENT DOCUMENTS

| | | | | |
|---|---|---|---|---|
| CN | 101796386 A | 8/2010 | | |
| CN | 102762990 A | 10/2012 | | |
| CN | 203688548 U | 7/2014 | | |
| CN | 104034317 A | 9/2014 | | |
| CN | 105222833 A | 1/2016 | | |
| CN | 106841556 A | 6/2017 | | |
| DE | 3420947 A1 | 12/1984 | | |
| DE | 102007016237 A1 | 10/2008 | | |
| DE | 102011003438 A1 | 8/2012 | | |
| DE | 102011003438 A1 * | 8/2012 | ............ | G01K 13/02 |
| DE | 102011055367 A1 | 5/2013 | | |
| DE | 102015213077 A1 | 5/2016 | | |
| DE | 102015004104 A1 | 9/2016 | | |
| DE | 102015120528 A1 | 6/2017 | | |
| DE | 102015120528 A1 * | 6/2017 | ............ | G01D 21/00 |
| EP | 0320086 A2 | 6/1989 | | |
| EP | 0743535 A1 | 5/1996 | | |
| EP | 2104837 B1 | 9/2017 | | |
| EP | 2919171 B1 | 10/2017 | | |
| JP | 2004291060 A | 10/2004 | | |
| WO | 2007061306 A1 | 5/2007 | | |
| WO | 2009033495 A1 | 3/2009 | | |
| WO | 2012104230 A1 | 8/2012 | | |

* cited by examiner

SYSTEM AND METHOD FOR SPATIALLY RESOLVED DETERMINATION OF AT LEAST ONE PHYSICAL OR CHEMICAL PROCESS VARIABLE

CROSS-REFERENCE TO RELATED APPLICATIONS

The present application is related to and claims the priority benefit of German Patent Application No. 10 2017 126 128.1, filed on Nov. 8, 2017 and International Patent Application No. PCT/EP2018/075052, filed on Sep. 17, 2018, the entire contents of which are incorporated herein by reference.

TECHNICAL FIELD

The invention relates to a system for the spatially resolved determination of at least one physical or chemical process variable of a flowable medium arranged in a container in an automation system. The medium is preferably a liquid with or without solids fractions or a gas.

BACKGROUND

In automation systems, in particular in process automation systems, measuring devices for detecting the different process variables of a medium are often used. A measuring device usually consists of at least one sensor and an electronic unit which processes the data of the sensor and generates measured values for the corresponding process variable. A measuring device is often designed as a compact device—here, the sensor and electronic unit form a unit. However, the sensor and the electronic unit can also be arranged offset from one another. In both cases, the communication between the sensor and the electronic unit can take place by wire or wireless means.

The determination of the respective process variable: fill level, flow, pressure, temperature, moisture, pH, conductivity, turbidity, chemical composition, etc. of a medium which is located in a container (tank, pipeline, etc.) of any kind takes place in the known solutions at a defined measuring point. The measuring point is defined by the installation location of the measuring device or of the sensor. Consequently, the sensors supply information about the process variable which originates from the respective measuring point and/or from the immediate vicinity of the respective measuring point. If information about the process variable of different measuring points is required, a corresponding measuring device or a corresponding sensor must be installed at each of the measuring points of interest. This is, of course, rather complicated and correspondingly expensive.

In addition, adding temperature sensors designed as sensor spheres to the flowable measuring medium has become known, particularly for temperature measurement in a medium. Depending on the flow conditions of the medium, the sensor spheres then move arbitrarily and randomly in the medium and collect measurement data from the measuring points at which it is currently located at certain points in time or also continuously. The sensor spheres are then removed from the medium, and, for example, an average value for the temperature prevailing in the medium can be determined on the basis of the data read out.

The disadvantages of the known solutions are obvious. In the first of the known solutions mentioned, the measurement data represents the process variable at one or a few selected and predetermined measuring points. Whether the values are representative of the process variable in the medium remains open or uncertain. With the known solution mentioned second, although the measurement data of the process variable originate from different measuring points within the medium, the measuring points in the container at which the sensor spheres have determined the measurement data of the process variable remain unknown. In addition to the lack of location information, a shortcoming of the measurement data is also that it is not available in real time. Particularly in the case of dynamic processes with which rapid changes in the process variable are to be expected, the second solution is also not very informative, since, in all cases, the measurement data only provides conclusions about a state/value of the process/process variable in the past. The second solution is not suitable for control purposes.

SUMMARY

The invention is based on the object of proposing a system which enables a spatially resolved detection of at least one process variable of a flowable medium.

To achieve this object, the system described below is proposed for the spatially resolved determination of at least one physical or chemical process variable of a flowable medium arranged in a container in an automation system: At least one sensor is provided, which is movable in the medium and/or in the container and which ascertains information about the at least one process variable. Furthermore, the following are provided: a position determination unit which supplies the information about the respective current position of the sensor relative to the medium and/or the container, and a data transmission unit which collects information about the respective current position of the sensor and the corresponding information supplied by the sensor about the at least one process variable and/or communicates it to an external control unit and/or display unit. Alternatively, the measurement data can be stored in the sensor as unevaluated and unprocessed raw measurement data or as evaluated and processed measurement data. Depending on the embodiment, suitable electronic and/or memory components are therefore assigned to the sensor.

The transmission of the data takes place at predetermined time intervals; however, the measurement data can also be transmitted continuously in real time to an external electronic unit or electronic unit arranged in the container. The transmission can take place either wirelessly or the sensor seeks out an electronic unit arranged in the container, docks there and transmits the data preferably wirelessly via a capacitive, inductive or optical transmission path.

The advantages of the solution according to the invention can be seen in the fact that the information about the value of a process variable is present at any arbitrary and/or desired position in the medium or in the container. Preferably, if the process requires this, the measurement data is provided with a corresponding time stamp in addition to the position specification. The position is specified either in relation to the medium located in a container and/or in relation to the container. Position-dependent measurement data of the process variable and/or time-dependent, position-dependent progressions of the process variable in the medium are thus available.

As an alternative to the docking solution mentioned above, the data is forwarded in real time to a display or storage unit via a corresponding radio device connected to the sensor. Depending on the specific application, the radio device can be configured as a transmitting unit or as a transmitting and receiving unit.

If the measurement data is used, for example, for control purposes or for recalibrations of, for example, permanently installed sensors/measuring devices, the measurement data is transmitted only in the event of a deviation from a predefined setpoint value. This reduces the energy requirement for the transmission of the measurement data. Furthermore, this embodiment has the advantage that a correspondingly reduced memory space has to be kept available in the sensor/measuring device. Furthermore, a higher data security is achieved, since the measurement data cannot be interpreted without knowledge of the underlying setpoint value range. Encryption of the measurement data can be achieved by this measure.

Furthermore, the system according to the invention has the advantage that the installation effort required in the case of permanently mounted sensors/measuring devices is saved.

Depending on the flow conditions prevailing in the medium, the change in position of the sensor follows the movement of the medium surrounding it and moving it. This also makes it possible, for example, to make statements about the vortex formation or the flow conditions in the medium. However, in order to provide an advantageous embodiment of the system according to the invention, the sensor is assigned a drive unit which is designed such that the sensor moves relative to the medium and/or relative to the container to different positions, or that the sensor is movable relative to the medium and/or to the container. In particular, this is necessary if the flow in the medium is approximately zero.

The movement paths can also run randomly in the case of a driven sensor/measuring device; however, it is also possible to control the movement of the sensor in a defined manner. In particular, this makes it possible for the sensor, for example, to provide measurement data preferably from critical regions of the medium.

An advantageous further development of the system according to the invention provides that the drive unit is designed such that the energy required for changing the position and/or for transmitting information to the external control and/or display unit is generated from the medium and/or from the process to which the medium in the container is subjected. For example, in the case of a medium in motion, the kinetic energy can be converted via a generator into electrical energy, which can then be used by the sensor for controlling the different positions within the medium or the container and/or for processing and forwarding the measurement data.

Alternatively, it is proposed that the sensor has an associated energy source with a limited capacity or a chargeable energy source for energy supply. Furthermore, it is provided that an energy source with limited capacity or a chargeable energy source for energy supply is assigned to the external control and/or display unit.

As already mentioned above, the drive unit is preferably assigned a control program, wherein the control program is designed such that the sensor controls different positions relative to the medium and/or to the container. The preferred embodiment has also already been mentioned, in which the sensor is assigned a memory unit in which the information about the respective current position of the sensor and the corresponding information about the at least one process variable provided by the sensor is temporarily stored.

Furthermore, the position determination unit is configured to provide and/or store the position of the sensor within the container at least at the points in time when the sensor provides the information about the at least one process variable. If necessary for an accurate determination of the respective process variable, a gyroscope for determining the position of the sensor is preferably assigned to the sensor.

A triangulation method is preferably used for position determination. For this purpose, at least one reference point is provided in or on the container. The current position of the sensor can be determined at any time via a three-dimensional run-time measurement, preferably of ultrasonic waves and with knowledge of the dimensions of the container (reference system internal to the container). Corresponding position determination units are sufficiently known from the prior art. Alternatively, it is possible for the position determination to take place via GPS.

The following is also proposed: a method for the spatially resolved determination of at least one physical or chemical process variable of a flowable medium arranged in a container in an automation system, wherein a system is used as has been described above in the different embodiments. The method comprises the following method steps:

During the commissioning phase of the automation system, the at least one sensor, which is added to the medium, supplies information about the at least one process variable from a plurality of positions within the container and/or the medium, The information about the at least one process variable is used to determine a plurality of relevant positions with which the deviation of the information about the at least one process variable exceeds a predefined threshold value, In the subsequent operating phase, the sensor preferably moves between the relevant positions, in order to provide information about the at least one process variable.

The invention further relates to a method for the spatially resolved determination of at least one physical or chemical process variable of a flowable medium of an automation system arranged in a container, wherein a system is likewise used as has been described in the different embodiments above. The method comprises the following method steps:

During the commissioning phase of the automation system, the at least one sensor supplies information about the at least one process variable from a plurality of positions within the container and/or the medium;

The information about the at least one process variable is used to determine a plurality of relevant positions with which the deviation of the information about the at least one process variable exceeds a predefined threshold value;

Before the start of the operating phase, sensors for determining the at least one process variable are permanently installed at the relevant positions, such sensors providing information about the at least one process variable in the operating phase.

The relevant positions are positions within the medium or the container at which the process variable to be determined assumes, for example, extreme values. A distillation column may be mentioned as an example. As a result of the detailed knowledge of the different behavior of the process variable within the medium, it is possible to select or parameterize the permanently installed sensors/measuring devices in such a way that they are optimally adapted to the values or the value range of the process variable to be measured at the respective measuring point.

In addition, according to an advantageous embodiment of the aforementioned method the following is proposed:

During the operating phase, in addition to the permanently installed sensors, at least one sensor is added to the medium or to the process and is configured to be moved to different positions in the medium or in the process, wherein the moving sensor preferably controls successive positions in the vicinity of the permanently installed sensors and from there provides information about the at least one process variable;

An error message is generated if the deviation of the information about the at least one process variable provided by at least one of the permanently installed sensors and the at least one moving sensor is outside a predetermined tolerance range.

If the deviation between the measured values of the movable sensor and the permanently installed sensor is outside the predefined tolerance range, the permanently installed sensor is optionally recalibrated via the external control unit and/or display unit. The recalibration can take place by wire or wireless means.

A preferred development of the two methods described above provides that the information about the at least one process variable is transmitted to the external control unit and/or display unit preferably only when the deviation of the information about the at least one process variable provided by the permanently installed sensors and by the at least one moving sensor is within the predefined tolerance range.

BRIEF DESCRIPTION OF THE DRAWINGS

The invention is explained in greater detail with reference to the following figures. The following is shown.

DETAILED DESCRIPTION

Figure 1:
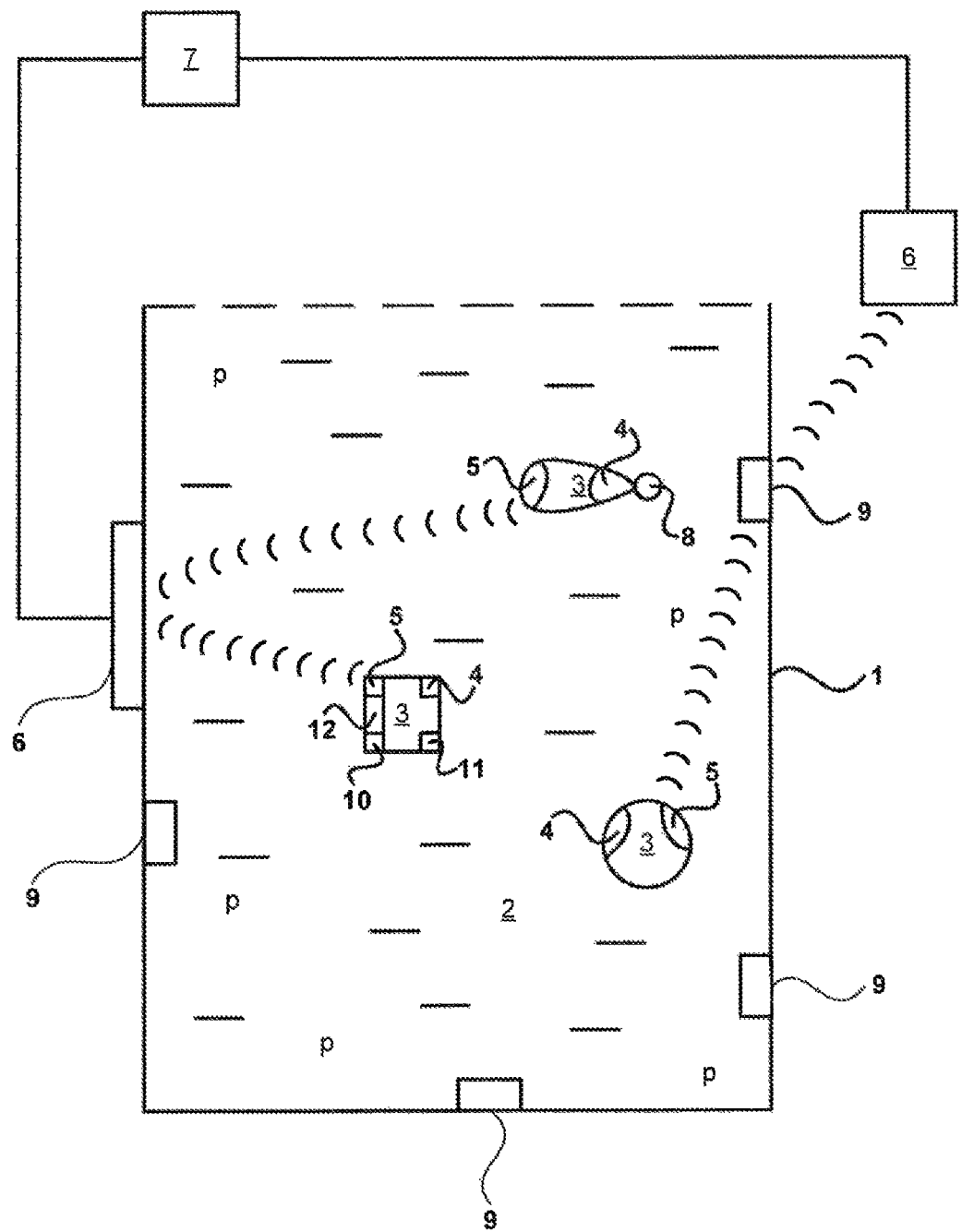
FIG. 1 shows a schematic representation of an embodiment of the system according to the present disclosure.

FIG. 1 shows a schematic representation of an embodiment of the system according to the invention for the spatially resolved determination of at least one physical or chemical process variable of a flowable medium 2 arranged in a container 1. At least one sensor 3—represented by three sensors 3—moves relative to the medium 2 or relative to the container 1 and collects measurement data from different positions within the medium 2. The sensors 3 have any design, but preferably a streamlined design. They either move "freely" in the medium 2, that is, they follow the movements carried out by the medium 2 itself and/or they are assigned a dedicated drive unit 8 via which the sensors 3 perform random or controlled movements.

Each sensor 3 is assigned a position determination unit 4 which provides information about the respective current position of the sensor 3 relative to the medium 2 and/or to the container 1. By means of a data transmission unit 5, the information about the respective current position of the sensor 3 and the associated information about the at least one process variable provided by the sensor 3 is detected/collected and/or transmitted to an external control unit and/or display unit 6, 7. The external control unit and/or display unit 6, 7 is designed, for example, as a docking station for the sensors 3 on the container 1. At certain time intervals, the sensors 3 control the docking station 6, transmit the data collected in a storage unit 10, which is then forwarded to the display/control unit 7. Optionally, during docking, the rechargeable energy source 11 associated with the sensor 3 is also charged. The sensors 3 additionally or alternatively radio the measurement data to an external control unit and/or display unit 6. The streamlined sensor 3 has a drive unit 8 which is designed in such a way that the sensor 3 receives its required energy from the process/from the medium. Permanently installed sensors/measuring devices 9 are provided in the medium or in the container at defined positions. Further advantageous embodiments of the system according to the invention have already been described in detail above.

Figure 2:
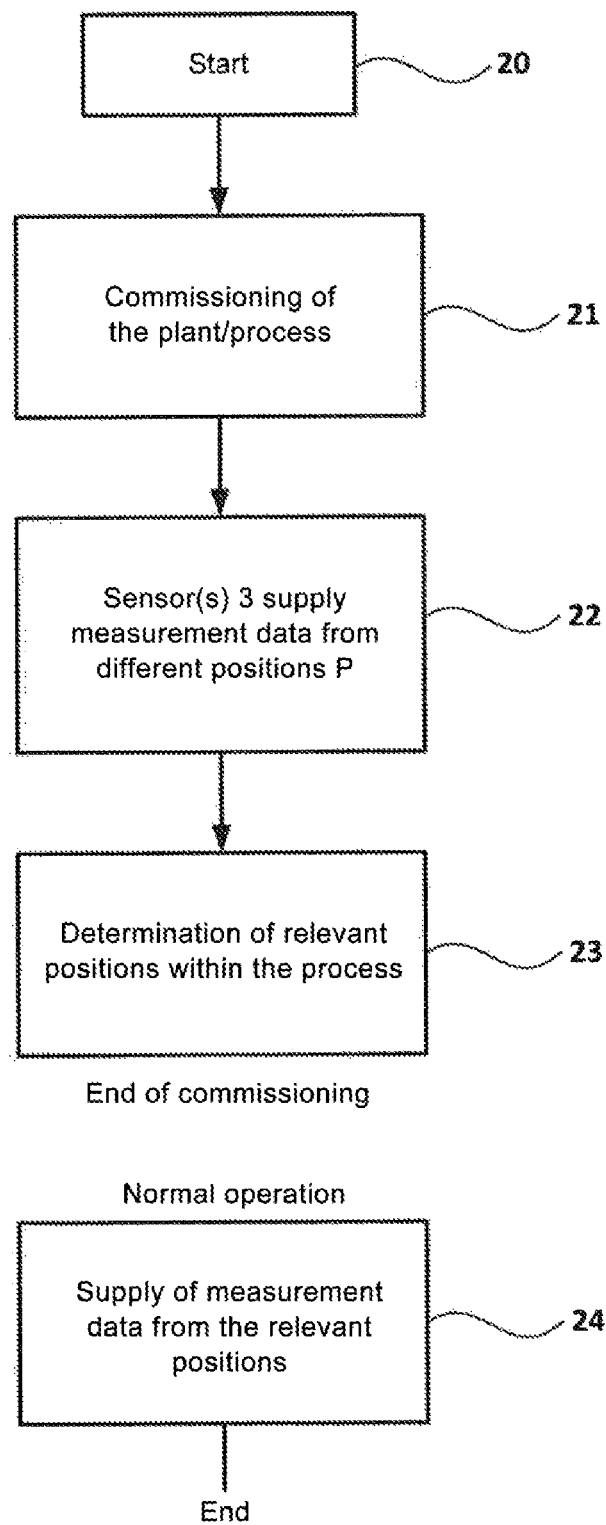
FIG. 2 shows a flowchart for visualizing a first method that can be carried out with the system according to the present disclosure.

FIG. 2 shows a flowchart for visualizing a first method which can be carried out with the system according to the invention for the spatially resolved determination of at least one physical or chemical process variable of a flowable medium 2 arranged in a container 1. This method is used in particular in the first or a subsequent commissioning of the process taking place in the container.

After the start of the method at the program point 20, the system or the process taking place in the container 1 is commissioned at the program point 21. At the program point 22, the sensor 3 or sensors 3 supply measurement data with respect to the at least one process variable continuously or at certain time intervals. Since the sensor 3 moves relative to the medium 2/and or to the container 1, the measurement data relating to the process variable originate from different positions P. The positions P of the sensor 3 or of the sensors 3 are preferably defined and determined on the basis of the reference system internal to the container and/or the medium. At program point 23, a plurality of relevant positions are determined by the external control unit and/or display unit 6, 7 on the basis of the position-dependent measurement data provided, with which, for example, the deviation of the measurement data of the at least one process variable exceeds a predefined threshold value, for example in relation to a predefined mean value of the process variable in the medium 2. These positions P are considered critical positions within the process. During the subsequent normal operation of the automation system—that is to say the defined process which takes place in the container 1—the sensor 3 preferably moves or the sensors 3 preferably move between the relevant positions in order to provide information about the at least one process variable. This step corresponds to program point 24.

Figure 3:
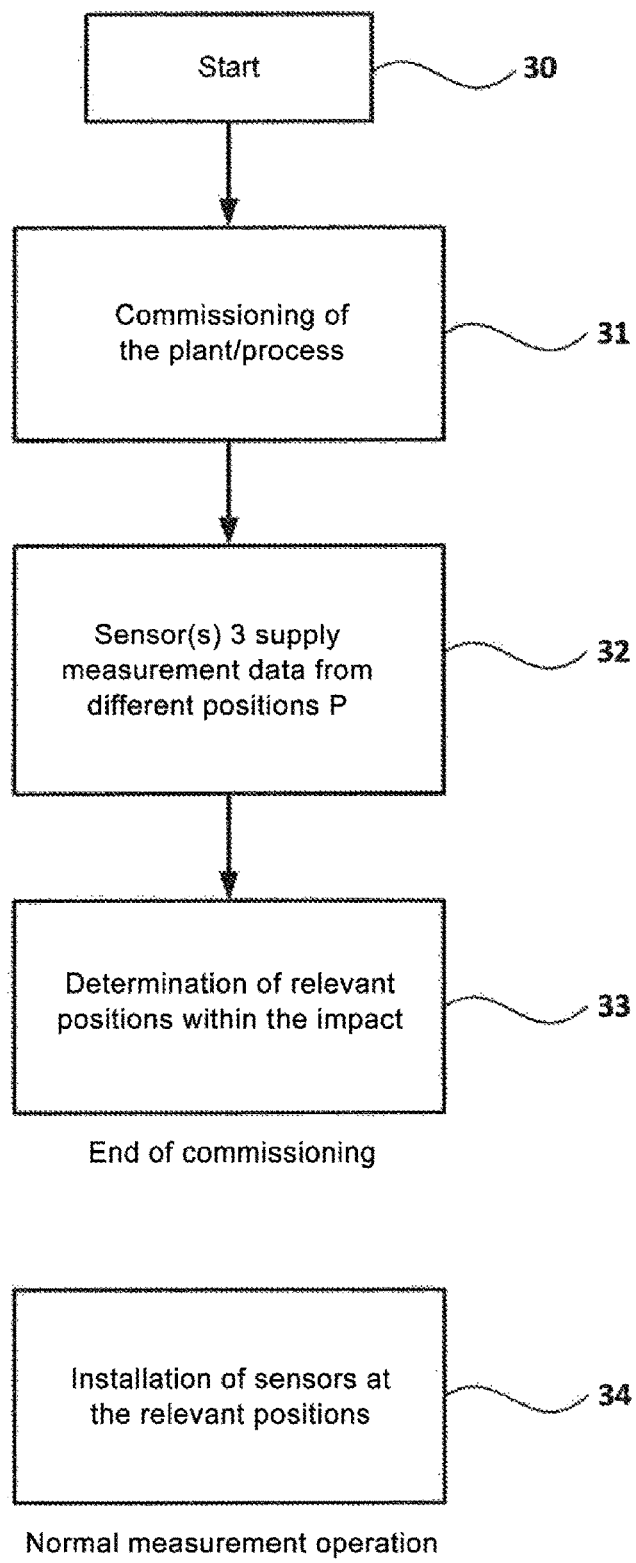
FIG. 3 shows a flowchart for visualizing a second method that can be carried out with the system according to the present disclosure.

FIG. 3 shows a flowchart for visualizing a second method which can be carried out with the system according to the invention for the spatially resolved determination of at least one physical or chemical process variable of a flowable medium 2 arranged in a container 1. Program points 30-33 correspond to program points 20-23 of the method described above, so that repetition is omitted. However, in normal operation—at program point 34—sensors 3 for determining the at least one process variable are permanently installed here at the relevant positions determined in the commissioning phase. During normal operation of the automation system, such sensors subsequently provide information about the at least one process variable, specifically from the critical positions/measuring points within the container 1/or the process (program point 34).

The invention claimed is:

1. A method for a spatially resolved determination of at least one physical or chemical process variable of a flowable medium arranged in a container in an automation system, the method comprising:

providing a system for the spatially resolved determination of the at least one physical or chemical process variable, the system including:

a sensor that is movable in the medium and/or in the container, wherein the sensor is configured to collect measurement data with respect to the at least one process variable;

a position determination unit configured to supply a current position of the sensor relative to the medium and/or to the container; and a data transmission unit configured to collect from the sensor the current position of the sensor and the corresponding measurement data and/or to communicate the current position and the corresponding measurement data to an external control unit and/or display unit;

during a commissioning phase of the automation system, the sensor collecting measurement data with respect to the at least one process variable at a plurality of positions within the container and the medium;

for each of the measurement data, determining a deviation of a respective measured value from a predefined value;

determining a plurality of relevant positions at which the respective deviation exceeds a predefined threshold value; and in a subsequent operating phase, the sensor moving among the plurality of relevant positions to collect measurement data with respect to the at least one process variable.

2. The method according to claim 1,
wherein the sensor includes a drive unit, and the sensor is moved relative to the medium and/or to the container by the drive unit.

3. The method according to claim 2,
wherein the drive unit is configured to generate energy required for changing the position and/or for transmitting information to the external control and/or display unit from the medium and/or from a process to which the medium in the container is subjected.

4. The method according to claim 1,
wherein the system further includes an energy source with limited capacity or a chargeable energy source for supplying power to the system or components of the system provided in the container.

5. The method according to claim 1,
wherein an energy source with limited capacity or a chargeable energy source for energy supply is assigned to the external control and/or display unit.

6. The method according to claim 2,
wherein the drive unit includes a control program, and the sensor is moved to different positions relative to the medium and/or to the container by the control program.

7. A method for a spatially resolved determination of at least one physical or chemical process variable of a flowable medium arranged in a container in an automation system, the method comprising:

providing a system for the spatially resolved determination of the at least one physical or chemical process variable, the system including:

a sensor that is movable in the medium and/or in the container, wherein the sensor is configured to collect measurement data with respect to the at least one process variable;

a position determination unit configured to supply a current position of the sensor relative to the medium and/or to the container; and a data transmission unit configured to collect from the sensor the current position of the sensor and the corresponding measurement data and/or to communicate the current position and the corresponding measurement data to an external control unit and/or display unit;

during a commissioning phase of the automation system, the sensor collecting measurement data with respect to the at least one process variable at a plurality of positions within the container and the medium;

for each of the measurement data, determining a deviation of a respective measured value from a predefined value;

determining a plurality of relevant positions at which the respective deviation exceeds a predefined threshold value; and before a start of an operating phase, permanently installing at the plurality of relevant positions sensors for determining the at least one process variable, such sensors providing measurement data with respect to the at least one process variable in the operating phase.

8. The method according to claim 7, further comprising:

during the operating phase, in addition to the permanently installed sensors, adding an additional sensor to the medium or to the process and configuring the additional sensor to be moved to different positions in the medium or in the process, wherein the moving additional sensor controls successive positions in a vicinity of the permanently installed sensors and provides information about the at least one process variable; and generating an error message if the deviation of the information about the at least one process variable provided by the permanently installed sensors and by the moving additional sensor is outside a predetermined tolerance range.

9. The method according to claim 7, further comprising:

transmitting the measurement data to the external control unit and/or to display unit only when the deviation of the information about the at least one process variable provided by the permanently installed sensors and by the moving additional sensor is within the predefined tolerance range.

10. The method according to claim 7,
wherein the sensor includes a memory unit, and the information about the respective current position of the sensor and the corresponding information about the at least one process variable provided by the sensor is temporarily stored in the memory unit.

11. The method according to claim 7,
wherein the position determination unit is configured to provide and/or store the position of the sensor within the medium and/or the container at least at the points in time when the sensor provides the information about the at least one process variable.

12. The method according to claim 7,
wherein the sensor further includes a gyroscope, and the gyroscope is used for determining the position of the sensor.

13. The method according to claim 7,
wherein the position determination unit determines the current position of the sensor by means of a triangulation method.

* * * * *